US006160563A

United States Patent [19]

LaTour

[11] Patent Number: 6,160,563

[45] Date of Patent: *Dec. 12, 2000

[54] PEN AND INK SUPPLY TUBE ASSEMBLY FOR PLOTTERS AND THE LIKE

[75] Inventor: Daniel A. LaTour, Stafford Springs, Conn.

[73] Assignee: Gerber Garment Technology, Inc., Tolland, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/505,566

[22] Filed: Jul. 21, 1995

[51] Int. Cl.[7] .................. G01D 15/16

[52] U.S. Cl. .................. 346/140.1

[58] Field of Search .................. 346/140.1, 139; 347/85, 86, 87

[56] References Cited

U.S. PATENT DOCUMENTS

| | | | |
|---|---|---|---|
| 3,213,460 | 10/1965 | Gilovich | 346/29 |
| 3,335,424 | 8/1967 | Hartai | 346/140.1 |
| 4,484,202 | 11/1984 | Sayko | 346/140 |
| 4,749,314 | 6/1988 | LeBlond | 408/68 |
| 5,489,931 | 2/1996 | Shibata et al. | 347/85 |
| 5,602,577 | 2/1997 | Shibata et al. | 347/84 |

FOREIGN PATENT DOCUMENTS

| | | |
|---|---|---|
| 0 484 100 A1 | 10/1991 | European Pat. Off. . |
| 0 684 137 A2 | 4/1995 | European Pat. Off. . |
| 57-64561 | 4/1982 | Japan . |
| 61-63455 | 4/1986 | Japan . |

*Primary Examiner*—John Barlow

*Assistant Examiner*—Charlene Dickens

*Attorney, Agent, or Firm*—McCormick, Paulding & Huber LLP

[57] ABSTRACT

A coiled ink supply tube for an X, Y plotter and the like is connected between an ink reservoir and a pen mounted within a pen holder and moveable with the pen holder between a raised non-drawing position and a lowered drawing position for drawing lines or graphics on receiving surfaces. The ink supply tube defines a preformed coil having 1¼ turns or windings in the form of a helix with substantially zero spacing between turns. The ink supply tube also defines a straight inlet section coupled between the coil and the reservoir and oriented parallel to the axis of the coil, and a straight outlet section substantially coaxial with a vertical axis of the pen and lying in a plane substantially perpendicular to the axis of the coil. As the pen moves up and down between the raised non-drawing and lowered drawing positions, the diameter of the helical coil changes very little and substantially no lateral forces are imposed by the ink supply tube on the pen. Similarly, the coiled ink supply tube presents a slight and substantially uniform vertical resistance to the pen throughout each cycle of the pen's up and down movement.

9 Claims, 4 Drawing Sheets

PEN AND INK SUPPLY TUBE ASSEMBLY FOR PLOTTERS AND THE LIKE

FIELD OF THE INVENTION

The present invention relates to apparatus, such as X, Y plotters, for drawing lines or graphics with a pen on a receiving surface, as provided for example by a sheet of paper, and relates more particularly to ink supply tubes or conduits for supplying ink to such pens.

BACKGROUND OF THE INVENTION

Plotters and other line or graphics drawing apparatus using pens, such as ball point pens or capillary tube pens, often mount the pen within a pen holder, and the pen holder is in turn driven by an electromechanical actuator, such as a solenoid, between a raised non-drawing position and a lowered drawing position for applying the ink to create lines or graphics on sheet material or other types of receiving surfaces. Such apparatus require that the pen be given an adequate supply of ink during a drawing process to assure the production of high quality, gap free lines, and for operation at high drawing speeds, this usually requires that the ink supplied to the pen be pressurized.

One known type of system for supplying pressurized ink to a pen includes a separate, refillable ink reservoir which holds a large quantity of ink and pressurized air for pressurizing the ink within the reservoir. The pressurized air may be continuously supplied to the ink reservoir during usage of the pen by an air pump mounted on the plotter or like apparatus, or may be introduced as a precharge behind the ink in the reservoir. An ink supply tube is connected between the reservoir and the pen, and the pressurized air discharges the ink from the reservoir, through the supply tube and into the pen.

One disadvantage experienced with this type of system is that the ink supply tube can impose both lateral and vertical forces on the upper end of the pen, which can in turn cause the pen and pen holder to bind, and can otherwise impede movement of the pen when driven between its raised non-drawing and lowered drawing positions.

Accordingly, it is an object of the present invention to overcome the drawbacks and disadvantages of prior art ink supply tubes or conduits for supplying ink to pens on plotters and like apparatus for drawing lines or graphics on sheet material or other receiving surfaces.

SUMMARY OF THE INVENTION

The present invention is directed to ink supply tube for an X, Y plotter and like apparatus having an ink reservoir and a pen mounted within a pen holder and moveable with the pen holder between a raised non-drawing position and a lowered drawing position. The ink supply tube defines a preformed coil including at least one turn, an inlet section coupled in fluid communication between the coil and the ink reservoir, and an outlet section coupled in fluid communication between the coil and the pen. At least a portion of the outlet section of the supply tube is either coaxial with, or parallel to a vertical axis of the pen.

Preferably, the performed coil is substantially helical shaped, defining approximately 1¼ turns of a helix with substantially zero spacing between turns. The preferred ink supply tube also defines a substantially straight inlet section coupled in fluid communication between the ink reservoir and the preformed coil and oriented substantially parallel to an axis of the coil, and a substantially straight outlet section lying within a plane approximately perpendicular to the axis of the coil and approximately coaxial with a vertical axis of the pen.

One advantage of the ink supply tube of the present invention is that its construction and orientation with respect to the pen substantially prevent the transmission of vertical and lateral forces from the tube to the pen that would otherwise impede movement of the pen between its drawing and non-drawing positions.

Other advantages of the ink supply tube of the present invention will become apparent in view of the following detailed description and accompanying drawings.

DETAILED DESCRIPTION OF A PREFERRED EMBODIMENT

Figure 1:
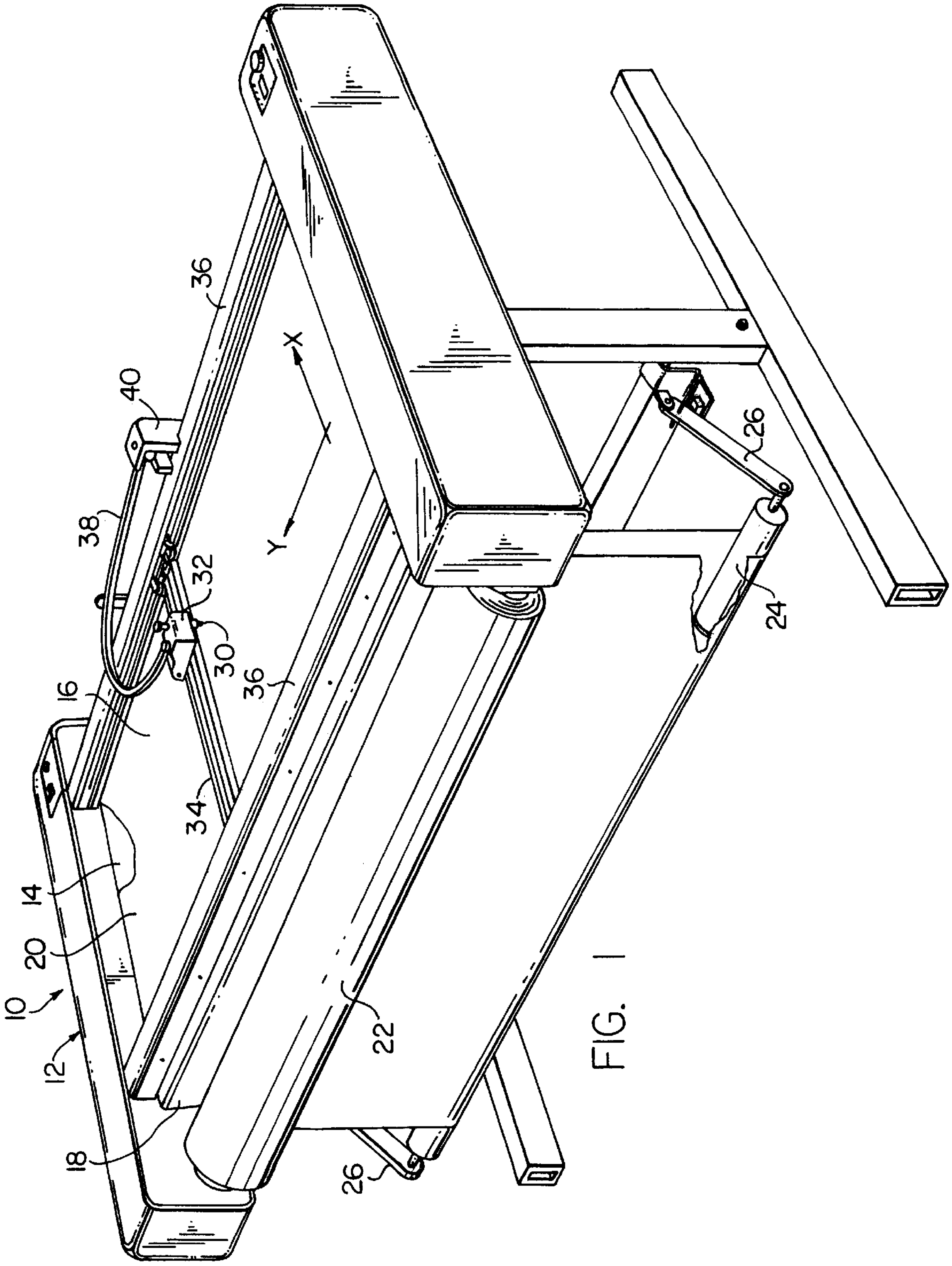
FIG. 1 is a perspective view of a plotter embodying the present invention.

The present invention has utility in a wide variety of apparatus wherein a pen or like drawing instrument is used to draw lines or graphics on a receiving surface. For the present description, such an apparatus is taken to be an X, Y plotter wherein a pen is moveable in two coordinate directions over a surface supporting paper or other type of sheet material providing the receiving surface. Such a plotter embodying the invention is shown in FIG. 1 and indicated generally by the reference numeral 10. The plotter 10 is preferably of the general type disclosed in U.S. Pat. No. 4,916,819, now Re. 34,394, entitled "Progressive Plotter With Unidirectional Paper Movement", which is assigned to the Assignee of the present invention, and is hereby expressly incorporated by reference as part of the present disclosure.

As shown in FIG. 1, the plotter 10 comprises a table 12 providing an upwardly facing, horizontal support surface 14 for supporting a portion 16 of a web of sheet material 18. The sheet material 18 may be paper or another desired type of material providing an upwardly facing receiving surface 20 onto which lines are drawn by a pen to create graphics, such as a marker used in the garment industry to show the shape and arrangement of pattern pieces to be cut from a lay-up of cloth sheets. As also shown in FIG. 1, the sheet material 18 is supplied from a supply roll 22 and is passed through a downwardly extending loop with a segmented dancer roll 24 received within the bight of the loop. The dancer roll 24 is rotatably mounted on each end to a respective mounting arm 26, and the mounting arms are pivotally supported on a base portion of the plotter frame for permitting movement of the dancer roll with the sheet material in an arc extending through a vertical plane. The sheet material is fed from the loop under the dancer roll 24 and in turn over the support surface 14 of the table by a pair of feed rolls (not shown) mounted on the opposite side of the table relative to the supply roll, and is wound onto a take-up roll (not shown) mounted adjacent to the feed rolls.

As also shown in FIG. 1, the plotter 10 further comprises a pen 30 mounted on a pen head 32 moveable in the illustrated X and Y-coordinate directions for drawing graphics on the receiving surface 20 of the portion 16 of the sheet material supported by the support surface 14. The pen head 32 is moveable in the X-coordinate direction relative to a carriage 34 extending in the X direction over the support surface 14 of the table, and is moveable in the Y-coordinate direction along the length of two side rails 36, 36 mounted on opposite sides of the table 12. Electrical power and signals for controlling operation of the pen 30 are communicated between the pen head 32 and the remainder of the plotter by a flexible wand 38, having one end pivotally connected to the pen head 32 and its other end pivotally connected to a fitting 40 fixed to one of the side rails 36 as shown.

The advancement of the sheet material 18 over the support surface 14 of the table may be coordinated with the operation of the pen head 32 in various ways. For example, a common mode of operation is to first draw a portion of the graphic on a respective section 16 of the sheet material then located on the support surface 14 of the table. A fresh section of the sheet material 18 is then advanced onto the support surface 14 and the drawing operation is resumed to draw another portion of the graphic onto the fresh section of the sheet, and these alternate drawing phases and advancement phases are continued until a complete graphic is generated.

Figure 2:
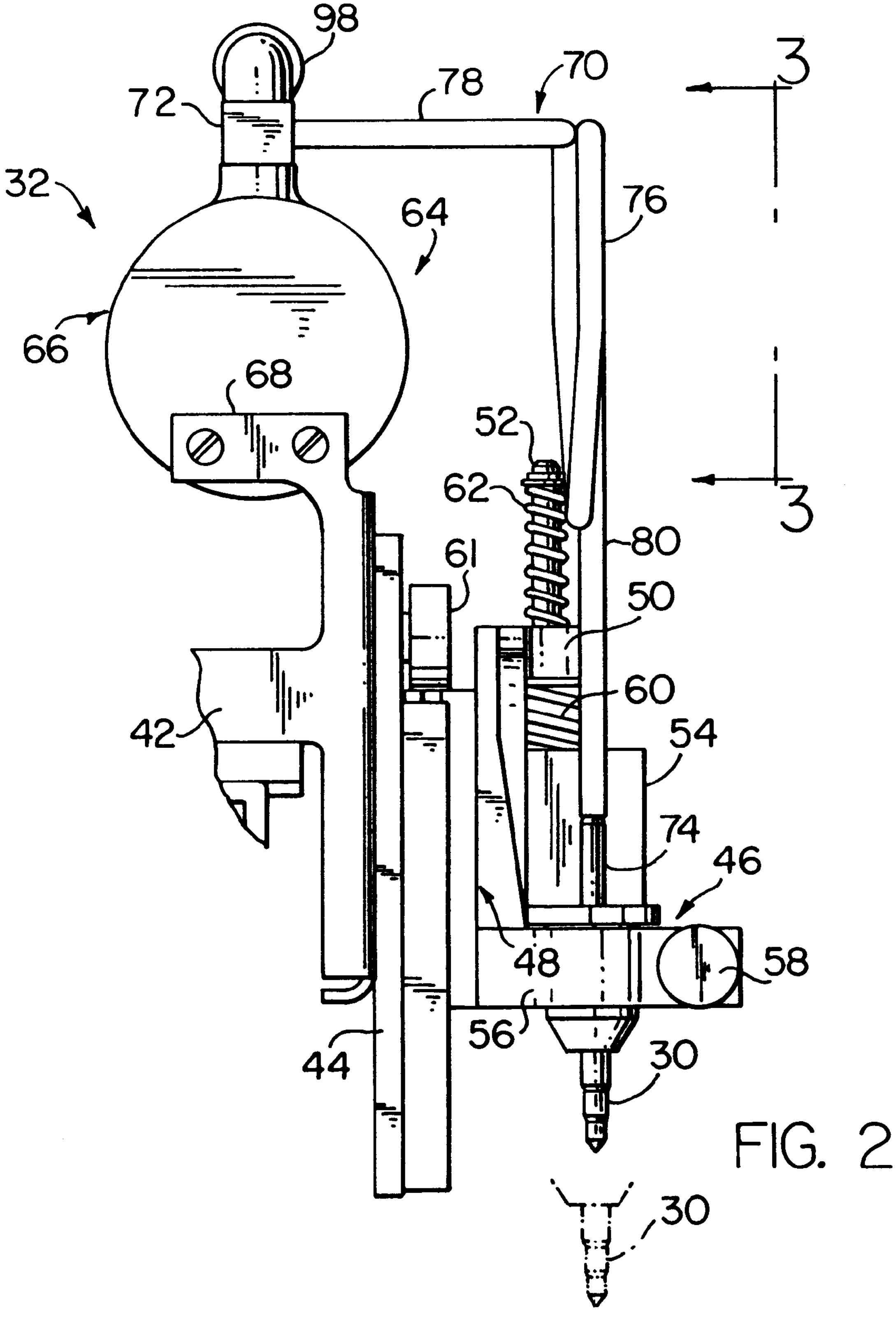
FIG. 2 is fragmentary elevational view of the pen head of the plotter of FIG. 1 with the pen head cover removed and showing the ink supply unit including the coiled ink supply tube coupled between the ink reservoir and the pen.

Turning to FIG. 2, the pen head 32 includes a base 42 suitably supported for and driven in movement along the length of the carriage 34. The pen head base 42 carries a support plate 44 fixedly mounted to one side of the base, and a pen holder 46 mounted to the support plate by a linear bearing assembly 48. The pen holder 46 includes a radially-extending arm 50 coupled to a plunger 52 of an electromechanical solenoid 54 mounted to the support plate. The pen holder 46 includes a split collar 56 for receiving the pen 30 and an adjustment screw 58 for tightening the collar around the pen.

Energization of the solenoid 54 drives the pen holder 46 and pen 30 downwardly into a lowered writing position, as indicated by the broken lines in FIG. 2, and de-energization of the solenoid permits a coil spring 60 to drive the pen holder and pen upwardly into a raised non-drawing position, as shown in solid lines in FIG. 2. A stop 61 is mounted above the inner race of the linear bearing assembly to limit upward movement of the pen and pen holder, and a coil spring 62 is mounted between a snap ring fixed to the top of the solenoid plunger 52 and the radial arm 50 to set the downward force applied by the pen to the sheet material.

The pen head 32 also carries an ink supply unit 64 comprising an ink reservoir 66 containing a supply of pressurized ink, which is fixedly mounted on each end to upstanding supports 68 of the pen head base 42.

Figure 5:
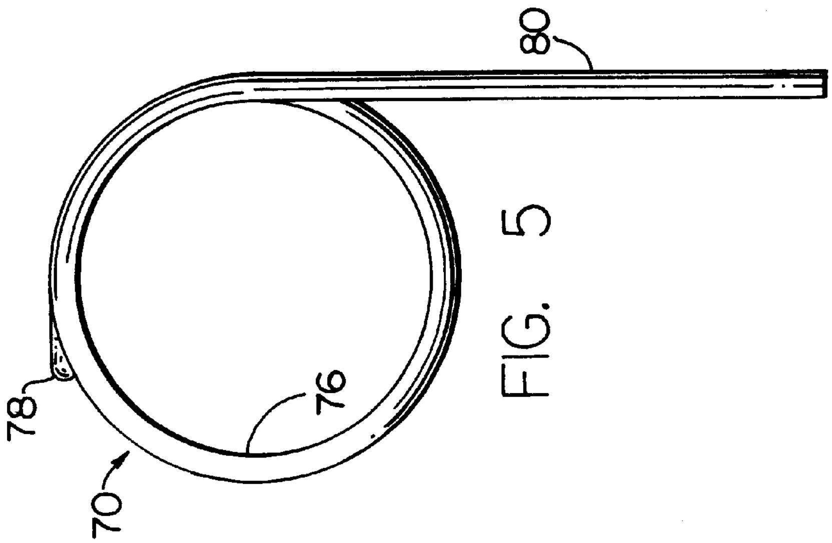
FIG. 5 is a front elevational view of the coiled ink supply tube of FIGS. 2 through 4.

In accordance with the present invention, a coiled ink supply tube 70 is connected on one end to a fitting 72 mounted on the top of the reservoir, and is connected on the other end to a tubular fitting 74 of the pen 30 for supplying pressurized ink to pen. As shown best in FIGS. 5 and 6, the ink supply tube 70 defines a preformed coil 76, which in the embodiment of the present invention illustrated, defines approximately 1¼ turns or loops in the shape of a helix with substantially zero spacing between the turns or loops. The ink supply tube 70 further defines a substantially straight inlet section 78 extending between the fitting 72 and coil 76, and a substantially straight outlet section 80 extending between the other end of the coil and the fitting 74 of the pen. The inlet section 78 is oriented substantially parallel to the axis of the coil 76, and the outlet section 80 is coaxial with a vertical axis of the pen and lies within a plane substantially perpendicular to the axis of the coil.

As shown in FIG. 2, when the ink supply tube 70 is connected between the ink reservoir 66 and the pen 30, the axis of the helical coil 76 is substantially perpendicular to the vertical axis of the pen. Accordingly, as the pen moves up and down between its raised non-drawing and lowered drawing positions, the diameter of the helical coil 76 changes very little and substantially no lateral forces are imposed on the pen. Similarly, the coiled ink supply tube presents a substantially uniform and slight resistance to the up and down movement of the pen. The circular-shaped turns or windings of the helical coil 76 are believed to facilitate in providing substantially uniform and slight resistance to the pen throughout each cycle of its up and down movement. Thus, in contrast to prior art ink supply tubes or conduits, the coiled ink supply tube of the present invention prevents the transmission or forces from the tube to the pen that would impede or otherwise interfere with the up and down movement of the pen.

Figure 6:
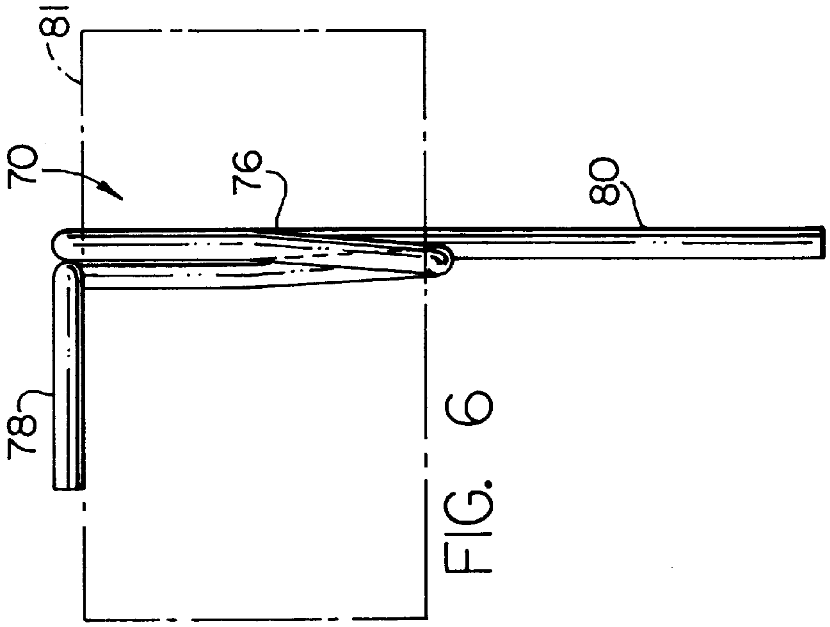
FIG. 6 is a side elevational view of the coiled ink supply tube of FIG. 5 showing in broken lines a cylindrical mandrel used to preform the coiled tube in accordance with the invention.

The ink supply tube 70 is preferably made of a suitable thermoplastic, polymeric material, such as polypropylene, which may be heat treated to preform the coil 76, and which retains sufficient flexibility after heat treating to permit the ink supply tube to move freely with the pen and pen holder between the raised non-drawing and lowered drawing positions. With reference to FIG. 6, the ink supply tube 70 is preformed by winding a section of the thermoplastic tubing onto a cylindrical mandrel 81 in the shape of a helix and orienting the end sections with respect to the helix as shown, and then heating the tube to a temperature sufficient to plastically deform the tube so that it will retain its helical shape when cooled.

As will be recognized by those skilled in the pertinent art, numerous other types of ink supply units and/or ink reservoirs may be employed with the ink supply tube of the present invention, such as ink reservoirs that receive pressurized air from a motorized pump mounted on the plotter or like apparatus, or that may use other means for supplying the ink to the coiled ink supply tube.

Figure 3:
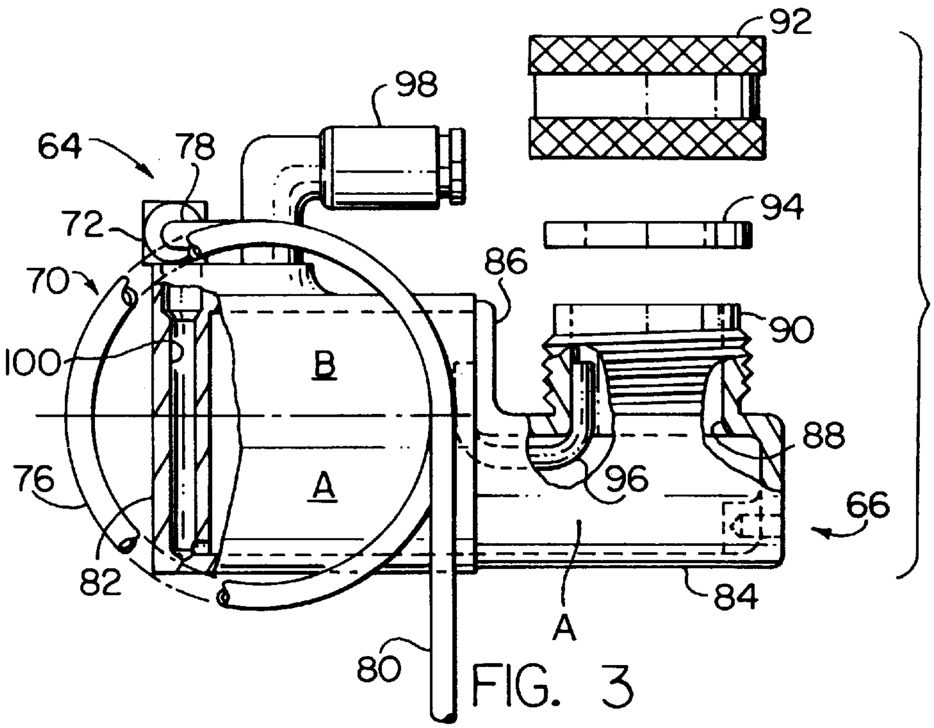
FIG. 3 is an exploded elevational view taken along line 3—3 of FIG. 2 showing in further detail the connection between the coiled ink supply tube and the ink reservoir with parts removed for clarity.
Figure 4:
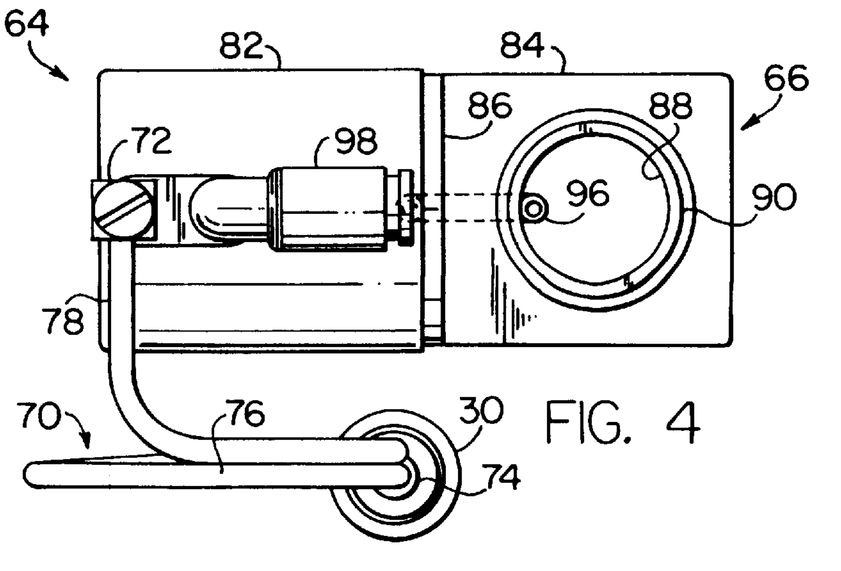
FIG. 4 is a plan view of the ink supply unit of FIG. 3 with the cap removed.

As shown in FIGS. 3 and 4, the ink reservoir 66 is formed by a hollow body including a first generally cylindrical section 82 joined to a second section 84 along a circular flange 86. The second section 84 defines a fill opening 88 extending through an upper wall of that section for introducing ink into the reservoir. As shown in FIG. 3, the ink reservoir 66 defines a lower ink chamber "A" extending throughout the second section 84 and into a lower portion of the first section 82, and an air chamber "B" located above the ink chamber A-within the first section. The air chamber B is provided for receiving a precharge of pressurized air to pressurize and in turn discharge the ink from the reservoir, through the coiled ink supply tube and into the pen. The boundary of the ink chamber A and air chamber B is defined by the level of ink in the reservoir as shown, and the relative volumes of the two chambers are selected so that upon filling the ink chamber to the top of the fill opening 88, the air chamber defines a volume sufficient to receive a precharge of pressurized air adequate to discharge all of the ink in the reservoir. A threaded neck 90 surrounds the fill opening 88 and projects upwardly therefrom, and a cap 92 is threadedly attached to the neck 90 with a gasket 94 seated between the cap and neck to provide a fluid-tight seal.

As also shown in FIGS. 3 and 4, a generally unshaped equalization tube 96 is mounted within the reservoir so that one end of the tube projects upwardly into the air chamber B (as shown in phantom in FIG. 3) and the other end projects through the fill opening 88 and into the neck 90. In the event that the cap 92 is removed from the reservoir before all of the ink is discharged, the equalization tube 96 will release the pressurized air remaining in the air chamber B and thus prevent the air from spewing ink through the neck.

As also shown in FIGS. 3 and 4, the ink supply unit 64 includes a quick-release, pneumatic valve 98 mounted on the boss formed on a top portion of the first section 82 of the reservoir and coupled in fluid communication with the air chamber B for introducing a precharge of pressurized air into the reservoir. As shown in FIG. 3, the ink reservoir 66 also defines a discharge conduit 100 extending through the back wall of the first section 82 and coupled in fluid communication between the base of the ink chamber A and the fitting 72 coupled to the inlet section of coiled ink supply tube 70. The pressurized air within the air chamber B pressurizes and in turn forces the ink upwardly through the discharge conduit 100 and into the ink supply tube 70 for supplying the pressurized ink to the pen 30.

As will be recognized by those skilled in the pertinent art, numerous changes may be made to the above-described and other embodiments of the invention without departing from the scope of the invention as defined in the appended claims. For example, the turns of the coiled ink supply tube may take a different geometric or curvilinear shape, such as an oval shape, and/or spacing may be provided between the turns of the preformed coil, in a manner which still provides an effective means for preventing the transmission of lateral forces, and minimizing the transmission of vertical forces between the ink supply tube and the pen in accordance with the present invention. As described above, the preformed coil of the ink supply tube should include at least one loop, turn or winding to effectively prevent or minimize the transmission of forces from the ink supply tube to the pen; however, it may be desirable to add additional loops, turns or windings to effectively perform this and other functions in accordance with the present invention. Accordingly, the detailed description of the preferred embodiment herein is to be taken in an illustrative, as opposed to a limiting sense.

What is claimed is:

1. An ink supply tube for use in a plotting apparatus to convey ink from an ink reservoir to a pen, there being a space between said pen and said ink reservoir and the pen extending along a longitudinal axis and being movable along said longitudinal axis between planes of drawing and non-drawing positions, said ink supply tube comprising:

a first end for connecting with an ink reservoir for receiving ink therefrom, said tube having a second end for connecting to the ink pen for supplying ink thereto, said tube having a coil portion performed so as to substantially retain its shape, said coil portion having at least one turn wound in the shape of a helix about a central axis, said tube further including an inlet section extending from said coil portion to said first end, a substantially straight outlet section extending from said at least one turn of said coil portion to said second end so as to lie in a plane substantially perpendicular to said central axis and to be coaxial with the longitudinal axis, and said planes of drawing and non-drawing positions being perpendicular to the longitudinal axis, whereby when said first and second ends are connected to the ink reservoir and the pen, respectively, said tube allows movement of the pen between the drawing and non-drawing position without imposing on the pen lateral forces that would impede the pen when moving between the drawing and non-drawing positions.

2. An ink supply tube as defined in claim 1, wherein:

said outlet section of said tube extends tangentially from said at least one turn of said coil portion.

3. An ink supply tube as defined in claim 1 wherein:

said coil portion is in a circular shape about said central axis.

4. An ink supply tube as defined in claim 3 wherein:

said coil portion defines approximately one and one quarter turns.

5. An ink supply tube as defined in claim 1, wherein:

said inlet section of said tube is substantially straight and extends from said coil portion approximately parallel to said central axis for connecting with said ink reservoir.

6. An ink supply tube as defined as defined in claim 1 wherein:

said soil portion has a first turn and at least a first portion of a second turn with substantially zero spacing between said first turn and said first portion of said second turn.

7. An ink supply tube as defined in claim 1, wherein:

said coil portion of said tube has been preformed by winding the tube onto a mandrel and heating the tube to a temperature sufficient to cause the tube to substantially retain the shape given to it by said mandrel after being cooled and removed by said mandrel.

8. An ink supply tube for use in a plotting apparatus to convey ink from an ink reservoir to a pen spaced therefrom, the pen having a longitudinal axis and being movable along the longitudinal axis between planes of drawing and non-drawing positions, the ink supply tube comprising:

a first end for connecting with an ink reservoir for receiving ink therefrom, a second end for connecting to the ink pen for supplying ink thereto, and a preformed coil portion, said coil portion including at least one turn wound about a central axis, said tube further including an inlet section extending from said coil portion to said first end, an outlet section, said outlet section being substantially straight, lying in a plane perpendicular to said central axis and extending tangentially from said at least one turn of said portion to said second end of said tube, said outlet section further being coaxial helix with the longitudinal axis of the pen when said second end is connected thereto, and the longitudinal axis being perpendicular to the planes of drawing and non drawing positions, whereby when said first and second ends are connected to the ink reservoir and the pen, respectively, said tube allows movement of the pen between the drawing and non-drawing positions along the longitudinal axis without imposing on the pen lateral forces that would impede the pen when moving between the drawing and non-drawing positions.

9. An ink supply tube for use in a plotting apparatus to convey ink from an ink reservoir to a pen spaced therefrom, the pen having a longitudinal axis and being movable along the longitudinal axis between planes of drawing and non-drawing positions, the ink supply tube comprising:

an inlet end for connecting with an ink reservoir for receiving ink therefrom, an outlet end for connecting to the ink pen for supplying ink thereto, and a preformed coil portion, said coil portion including at least one and one quarter circular turns wound about a central axis, said tube further including an inlet section extending from said coil portion to said inlet end, and a substantially straight outlet section extending from said at least one and one quarter circular turns to said outlet end so as to lie in a plane substantially perpendicular to said central axis, said outlet section further being coaxial with the longitudinal axis of the pen when said outlet end is connected thereto, the longitudinal axis being perpendicular to the planes of drawing and non drawing positions, and whereby when said first and second ends are connected to the ink reservoir and the pen, respectively, said tube allows movement of the pen between the drawing and non-drawing positions along the longitudinal axis without imposing on the pen lateral forces that would impede the pen when moving between the drawing and non-drawing positions.

* * * * *

UNITED STATES PATENT AND TRADEMARK OFFICE
CERTIFICATE OF CORRECTION

PATENT NO. : 6,160,563
DATED : December 12, 2000
INVENTOR(S) : Daniel A. LaTour

It is certified that error appears in the above-identified patent and that said Letters Patent is hereby corrected as shown below:

Column 3, line 66, after "to" please insert -- the --.
Column 5, line 6, please change "unshaped" to -- u-shaped --.

Claim 6, line 3, please delete "soil" and insert -- coil --.

Signed and Sealed this

First Day of May, 2001

Attest:

*Nicholas P. Godici*

NICHOLAS P. GODICI

*Attesting Officer* *Acting Director of the United States Patent and Trademark Office*